United States Patent
Imai

(10) Patent No.: US 10,608,499 B2
(45) Date of Patent: Mar. 31, 2020

(54) BEARING RETAINER FOR VIBRATION MOTOR

(71) Applicant: Tokyo Parts Industrial Co., Ltd., Gunma-ken (JP)

(72) Inventor: Hidekazu Imai, Gunma-ken (JP)

(73) Assignee: Tokyo Parts Industrial Co., Ltd. (JP)

( * ) Notice: Subject to any disclaimer, the term of this patent is extended or adjusted under 35 U.S.C. 154(b) by 144 days.

(21) Appl. No.: 15/954,669

(22) Filed: Apr. 17, 2018

(65) Prior Publication Data

US 2018/0358865 A1    Dec. 13, 2018

(30) Foreign Application Priority Data

Jun. 13, 2017  (JP) .................................. 2017-115578

(51) Int. Cl.
| | |
|---|---|
| *H02K 7/06* | (2006.01) |
| *A63F 13/28* | (2014.01) |
| *H02K 7/08* | (2006.01) |
| *A63F 13/285* | (2014.01) |
| *A63F 13/24* | (2014.01) |

(52) U.S. Cl.
CPC ............. *H02K 7/063* (2013.01); *A63F 13/28* (2014.09); *A63F 13/285* (2014.09); *H02K 7/083* (2013.01); *A63F 13/24* (2014.09)

(58) Field of Classification Search
CPC ........ H02K 7/063; H02K 7/083; H02K 7/061; H02K 5/16; H02K 5/161
USPC .......................................................... 310/81
See application file for complete search history.

(56) References Cited

U.S. PATENT DOCUMENTS

| | | | |
|---|---|---|---|
| 2005/0046302 A1* | 3/2005 | Suzuki ................... | H02K 5/225 310/239 |
| 2017/0179784 A1* | 6/2017 | Nishidate ............... | H02K 7/081 |

FOREIGN PATENT DOCUMENTS

| | | | |
|---|---|---|---|
| JP | 11356008 A | * | 12/1999 |
| JP | 11356008 A | | 12/1999 |

OTHER PUBLICATIONS

Machine translation of JP-11356008-A. (Year: 1999).*

* cited by examiner

*Primary Examiner* — Michael Andrews
(74) *Attorney, Agent, or Firm* — Jordan and Koda, PLLC

(57) ABSTRACT

A motor case of a vibration motor has a first tubular part and a first inward flange integrally formed in a flange shape in the inward direction from the upper opening end of the first tubular part. A rotary shaft 30 is supported in an upper oil-impregnated bearing and a lower oil-impregnated bearing, and an upper portion of the rotary shaft protrudes from the motor case. The rotary shaft is inserted into a soft washer, with the soft washer between the rotor unit and the upper oil-impregnated bearing. A weight is eccentrically fixed to the upper portion of the rotary shaft, and an attraction magnet is fixed to the motor case and attracts the weight toward the motor case side. A retainer, which prevents the upper oil-impregnated bearing from coming out in the upward direction, is formed on the motor case.

2 Claims, 3 Drawing Sheets

BEARING RETAINER FOR VIBRATION MOTOR

BACKGROUND OF THE INVENTION

The present invention relates to a vibration motor installed, for example, in the housing of a computer game controller, and more particularly to a vibration motor in which impact sounds produced as a result of axial movement of a rotary shaft are reduced.

For example, as shown in FIG. 3, a DC motor 111 for generating vibration described in Japanese Patent Laid-Open Publication No. H11-356008 is disposed on a mounting seat 110 in the housing of a computer game controller. The DC motor 111 comprises a magnet 114, which is provided on the inner face of a casing 112, an armature 115, which is pivotally mounted on a motor shaft 113, a commutator 117, which is fixed to the motor shaft 113 and connected to a DC power supply by brushes 116, a terminal unit 118 and the like, and is configured so that the armature 115 is rotated by electromagnets due to the interaction of the magnet 114 and the current, in response to the DC power supply.

At the upper end part of the casing 112, the motor shaft 113 is supported by metal 119, and at the lower end part of the casing 112, the motor shaft 113 is supported by metal 119A. Furthermore, when assembling the armature 115, predetermined gap G is provided in advance between the axial center line Y of the armature 115 and the axial center line X of the magnet 114, this being formed so as to enhance the attraction of the magnet 114 with respect to the armature 115.

Furthermore, in order to impart a predetermined vibration to the DC motor 111, a weight 120 is eccentrically mounted on the motor shaft 113 that protrudes outside the casing 112.

Furthermore, the rotation of the DC motor 111 causes the motor shaft 113 to move up and down in conjunction with eccentric oscillation of the weight 120. At this time, a stopper 121 that is fixed to the motor shaft 113 impacts the casing 112, and impact sounds are generated.

Here, in order to enhance the attraction of the magnet 114, a permanent magnet 122 having a predetermined attractive force is mounted in the weight 120.

However, in the motor for generating vibration in Japanese Patent Laid-Open Publication No. H11-356008, there is a problem in that, if the stopper 121 is made of a hard material, the impact sounds will be greater than in the case where the stopper 121 is made of a soft material, such that the impact sounds cannot be sufficiently reduced.

Meanwhile, if the stopper 121 is made of a soft material, while the impact sounds generated by the axial movement of the motor shaft 113 will be reduced, it is possible that the stopper 121 will be deformed and thus will impact the metal 119A. Here, there is a problem in that the cylindrical metal 119A is fixed simply by way of insertion into the cylindrical bearing holder 112A, and therefore, if the stopper 121 deforms and impacts the metal 119A, it is possible that the metal 119A will be moved out of the casing 112 such that the reliability of the motor will tend to be inferior.

SUMMARY OF THE INVENTION

One or more embodiments of the present invention provide a vibration motor capable of reducing impact sounds generated by axial movement of a rotary shaft and enhancing the metal (oil-impregnated bearing) retention strength.

One mode of the present invention, which relates to a vibration motor for generating vibration, comprises:
a motor case made of a magnetic material, which has a first tubular part having an upper opening end and a lower opening end, and a first inward flange integrally formed in a flange shape in the inward direction from the upper opening end;
a bracket, which is fixed to the lower opening end;
an upper oil-impregnated bearing, which is fixed inside the first inward flange;
a lower oil-impregnated bearing, which is fixed to the bracket;
a rotary shaft, which is supported in the upper oil-impregnated bearing and the lower oil-impregnated bearing, an upper portion of which protrudes from the motor case;
a rotor unit, which is fixed to the rotary shaft within the motor case,
a soft washer, into which the rotary shaft is inserted, provided between the rotor unit and the upper oil-impregnated bearing;
a weight made of a magnetic material, which is eccentrically fixed to an upper portion of the rotary shaft; and
an attraction magnet fixed to the motor case or the weight, which attracts the weight toward the motor case,
wherein,
a retainer is formed on the motor case, which abuts against the upper oil-impregnated bearing in the axial direction when the upper oil-impregnated bearing is subjected to force in the upward direction and prevents the upper oil-impregnated bearing from coming out in the upward direction.

DETAILED DESCRIPTION OF THE PREFERRED EMBODIMENTS

Figure 1:
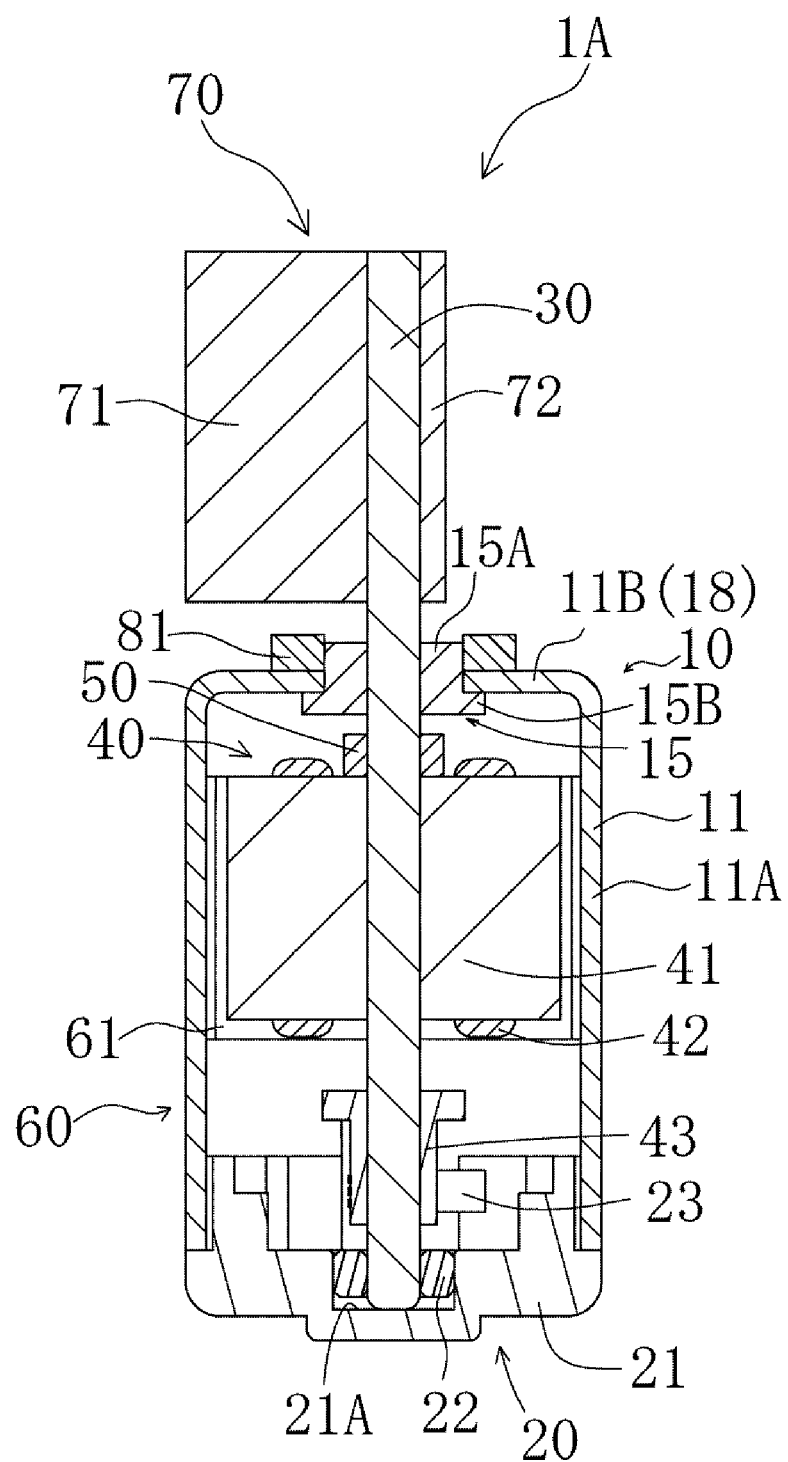
FIG. 1 is a sectional view of a vibration motor according to a first exemplary mode of embodiment of the present invention.
Figure 2:
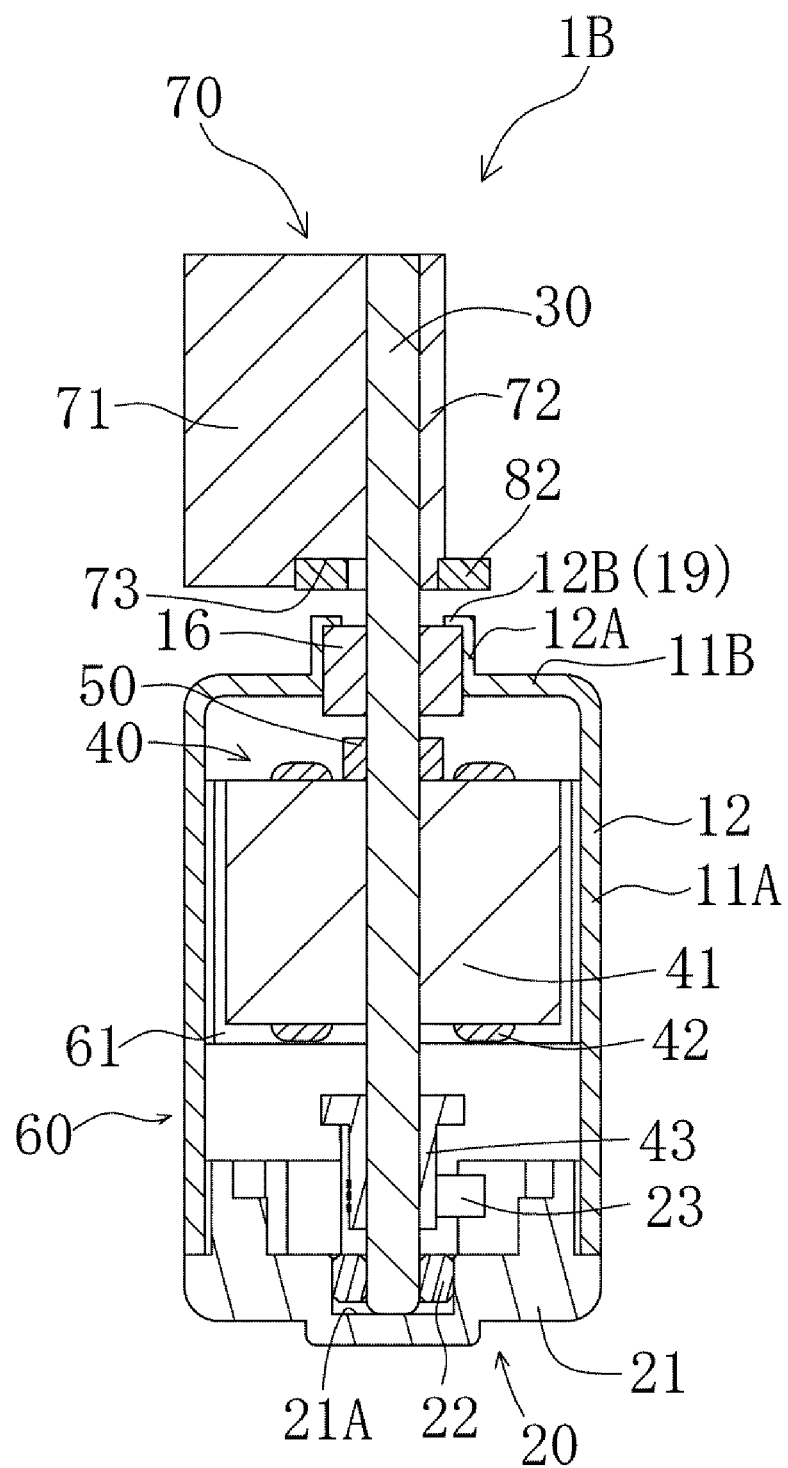
FIG. 2 is a sectional view of a vibration motor according to a second exemplary mode of embodiment of the present invention.
Figure 3:
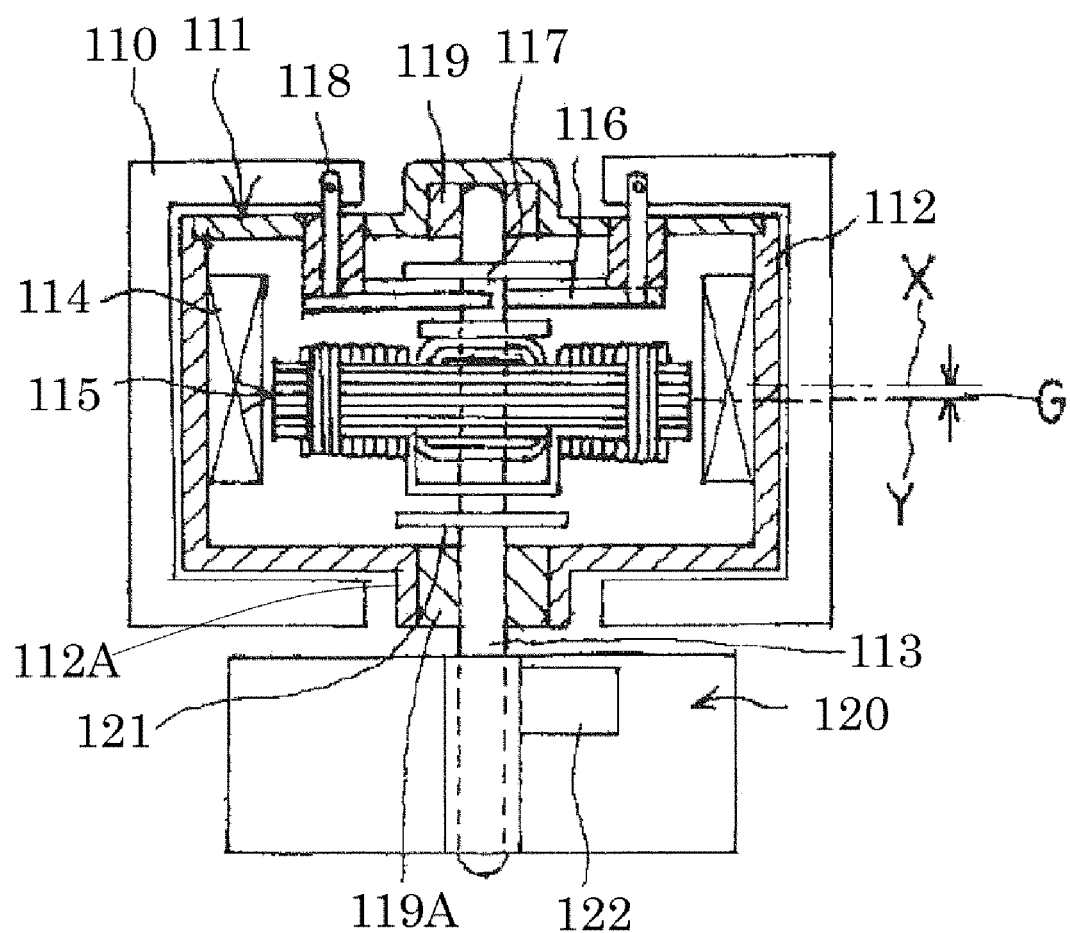
FIG. 3 is a sectional view of a conventional vibration motor.

In the present specification, upward, as drawn in FIG. 1 and FIG. 2, is referred to simply as "upward", and downward, as drawn in FIG. 1 and FIG. 2, is referred to simply as "downward."

Furthermore, the direction parallel to the rotary shaft 30 is referred to as "axial", the radial direction centered on the rotary shaft 30 is referred to simply as "radial", and the circumferential direction centered on the rotary shaft 30 is simply referred to as "circumferential."

Note that, the upward and downward directions do not indicate positional relationships or directions when the actual device is assembled.

First Exemplary Mode of Embodiment

First, a vibration motor 1A according to a first exemplary mode of embodiment of the present invention will be described with reference to FIG. 1.

The vibration motor in FIG. 1 comprises a brushed DC motor, and principally has a motor case unit 10, a bracket unit 20, a rotary shaft 30, a rotor unit 40, a washer 50, a stator unit 60, a weight 70, and an attraction magnet 81.

The motor case unit 10 has a motor case 11 and an upper oil-impregnated bearing 15.

The motor case 11 is formed from a plate of magnetic material, by way of pressing or the like. The motor case 11 has a first tubular part 11A formed in a tubular shape and a flat first inward flange 11B, which is integrally formed in the inward direction from an upper opening end of the first tubular part 11A. The inside of the first inward flange 11B serves as a bearing holder, on which the upper oil-impregnated bearing 15 is fixed. The inner circumferential face of the first inward flange 11B is circular.

The upper oil-impregnated bearing 15 has a cylindrically shaped cylindrical part 15A and a flange-shaped outward flange 15B formed integrally with the lower portion of the outer circumferential face of the cylindrical part 15A, and results from impregnating a porous material such as a sintered copper-based metal with lubricating oil.

The outward flange 15B is formed so as to have the same axial height all the way around in the circumferential direction.

The outer circumferential face of the cylindrical part 15A and the inner circumferential face of the first inward flange 11B are the same size. When the cylindrical part 15A is inserted into the first inward flange 11B, the upper oil-impregnated bearing 15 is fixed to the first inward flange 11B by way of press-fitting. Thus, the entire upper end face of the outward flange 15B comes into contact with the entire bottom face of the inner edge portion of the first inward flange 11B.

The bottom face of the inner edge portion of the first inward flange 11B serves as a retainer 18 against which the entire upper end face of the outward flange 15B abuts. The retainer in the present invention abuts against the upper oil-impregnated bearing in the axial direction when the upper oil-impregnated bearing is subjected to a force in the upward direction, and thus prevents the upper oil-impregnated bearing from coming out of the motor case in the upward direction.

Specifically, the retainer 18 in the present example is a portion against which the upper end face of the outward flange 15B abuts, so that the upper oil-impregnated bearing 15 does not move upward from the first inward flange 11B when the upper oil-impregnated bearing 15 is subjected to a force in the upward direction.

Furthermore, when the upper oil-impregnated bearing 15 is fixed to the first inward flange 11B, the upper end face of the cylindrical part 15A protrudes from the top face of the first inward flange 11B to the outside of the motor case 11.

The bracket unit 20 has a bracket 21, a lower oil-impregnated bearing 22, and brushes 23.

The bracket 21 is fixed to the lower opening end of the first tubular part 11A, and is a lid made of resin, which closes the motor case 11.

A pair of brushes 23 are mounted inside this bracket 21, and a pair of non-illustrated lead wires extend from one end of each brush 23 to the outside.

Furthermore, a recess 21A is formed in the center of the inside of the bracket 21, and a lower oil-impregnated bearing 22 is fixed in this recess 21A. The lower oil-impregnated bearing 22 results from impregnating a porous material, such as a sintered copper-based metal, with lubricating oil.

The rotary shaft 30 is an elongate cylindrical column and is rotatably supported in the upper oil-impregnated bearing 15 and the lower oil-impregnated bearing 22. The upper portion of this rotary shaft 30 protrudes upward beyond the motor case 11.

The rotor unit 40 has a laminated core 41, a winding 42, and a commutator 43, and is fixed to the rotary shaft 30 in the motor case.

The laminated core 41 results from laminating a plurality of three-pole core pieces extending in the radial direction at equal intervals.

The winding 42 is wound around each of the poles of the laminated core 41 with a winding cover therebetween.

The laminated core 41 and the winding 42 constitute an armature core.

The commutator 43 is fixed to the rotary shaft 30, and the pair of brushes 23 contact the commutator 43.

The rotary shaft 30 is inserted into the washer 50, which is ring shaped and is made of a soft material, with the washer 50 between the upper oil-impregnated bearing 15 and the rotor unit 40. The inner diameter of the washer 50 is slightly larger than the outer diameter of the rotary shaft 30 and the inner diameter of the upper oil-impregnated bearing 15. The outer diameter of the washer 50 is made smaller than the outer diameter of the cylindrical part 15A. A predetermined gap is formed in the axial direction between the lower end face of the upper oil-impregnated bearing 15 and the upper end face of the washer 50. Furthermore, when the rotary shaft 30 moves upward, the washer 50, which is disposed on the top face of the laminated core 41, contacts the upper oil-impregnated bearing 15.

The stator unit 60 has a driving magnet 61.

The driving magnet 61 is attached to the inner circumferential face of the first tubular part 11A so as to face the armature core of the rotor unit 40.

The armature core is designed so as to produce magnetic attraction in the downward direction with respect to the driving magnet 61. As a result, the rotary shaft 30 does not readily move in the upward direction.

The weight 70 is formed from a magnetic material having iron as a main component, and has a main body 71 formed as a semi-cylinder and a protrusion 72 formed following the axial direction on the chord side of the main body 71. A mounting hole is formed in this protrusion 72, and the upper portion of the rotary shaft 30 is fixed in the mounting hole, so as to attach the weight 70 to the rotary shaft 30. This mounting hole is positioned eccentrically with respect to the position of the center of gravity of the weight 70.

Furthermore, the weight 70 is disposed closer to the upper oil-impregnated bearing 15 than the lower oil-impregnated bearing 22, and thus the durability of the upper oil-impregnated bearing 15 when the rotor rotates tends be inferior. Here, in order to improve the durability of the upper oil-impregnated bearing 15 when the rotor rotates, the axial height of the upper oil-impregnated bearing 15 is made greater than the axial height of the lower oil-impregnated bearing 22.

The attraction magnet 81 is fixed to the top face of the first inward flange 11B of the motor case 11 and attracts the weight 70 toward the motor case side. The attraction magnet 81 is a cylinder. The outer diameter of the attraction magnet 81 is made smaller than the outer diameter of the main body 71 of the weight 70.

The inner circumferential face of the attraction magnet 81 is substantially the same size as the outer circumferential face of the cylindrical part 15A protruding from the top face of the first inward flange 11B. The attraction magnet 81 is positioned by way of the upper oil-impregnated bearing 15 and fixed to the top face of the first inward flange 11B by magnetic force, such that fixing by way of an adhesive material is not required.

The upper end face of the cylindrical part 15A is formed so as to be lower than the upper end face of the attraction magnet 81. There is a predetermined gap in the axial direction between the lower end face of the weight 70 and the upper end face of the attraction magnet 81.

Since the weight 70, which is made from a magnetic material is magnetically attracted toward the motor case 11 side, to which the attraction magnet 81 is fixed, the rotary shaft 30 will not be readily move upward.

In a vibration motor 1A such as above, a drive voltage from a non-illustrated DC power supply is applied to the brushes 23 via the lead wires, and the rotor unit 40 rotates due to the interaction between the current in the rotor unit 40 and the magnetic field of the stator unit 60, such that vibration is generated by the rotation of the weight 70 that is eccentrically fixed to the rotary shaft 30.

As described above, the vibration motor 1A in this example includes the motor case 11, which is made of a magnetic material, the bracket unit 20, the upper oil-impregnated bearing 15, the lower oil-impregnated bearing 22, the rotary shaft 30, the rotor unit 40, the soft washer 50, the weight 70, which is made of a magnetic material, and the attraction magnet 81.

Further, the motor case 11 includes a first tubular part 11A having an upper opening end and a lower opening end, and a first inward flange 11B integrally formed in a flange shape in the inward direction from the upper opening end of the first tubular part 11A.

Furthermore, the bracket 21 is fixed to the lower opening end of the first tubular part 11A.

Furthermore, the upper oil-impregnated bearing 15 is fixed inside the first inward flange 11B, and the lower oil-impregnated bearing 22 is fixed in the bracket 21.

Furthermore, the rotary shaft 30 is supported in the upper oil-impregnated bearing 15 and the lower oil-impregnated bearing 22, and the upper portion of the rotary shaft 30 protrudes from the motor case 11.

Furthermore, the rotor unit 40 is fixed to the rotary shaft 30 in the motor case, and the rotary shaft 30 is inserted into the washer 50, with the washer 50 between the rotor unit 40 and the upper oil-impregnated bearing 15.

Furthermore, the weight 70 is eccentrically fixed to the upper portion of the rotary shaft 30, and the attraction magnet 81 is fixed to the motor case 11 and attracts the weight 70 toward the motor case side.

Further, a retainer 18 is formed on the motor case 11, which abuts against the upper oil-impregnated bearing 15 in the axial direction when the upper oil-impregnated bearing 15 is subjected to force in the upward direction and thus prevents the upper oil-impregnated bearing 15 from coming out in the upward direction.

Accordingly, the weight 70, which is made of magnetic material, is magnetically attracted toward the motor case, to which the attraction magnet 81 is fixed, and therefore the sound of the impact between the washer 50 which moves united with the rotor unit 40, and the upper oil-impregnated bearing 15 can be reduced when the rotary shaft 30 moves in the vertical direction in conjunction with the eccentric oscillation of the weight 70.

Furthermore, since the washer 50 is soft, the impact sounds generated by the axial movement of the rotary shaft 30 can be further reduced.

Furthermore, since the retainer 18, which is abutted by the upper oil-impregnated bearing 15, is formed on the motor case 11, the strength of retention of the upper oil-impregnated bearing 15 when the washer 50, which moves united with the rotor unit 40, impacts the upper oil-impregnated bearing 15, can be enhanced allowing for a highly reliable vibration motor.

Furthermore, the upper oil-impregnated bearing 15 has a cylindrical part 15A and an outward flange 15B, which is formed integrally with the lower portion of the outer circumferential face of this cylindrical part 15A.

Furthermore, the retainer 18 is the bottom face of the first inward flange 11B, and the upper end face of the outward flange 15B abuts the retainer 18.

Accordingly, when the rotary shaft 30 moves in the vertical direction in conjunction with the eccentric oscillation of the weight 70, the upper oil-impregnated bearing 15 does not move outward from the motor case 11, whereby the strength of retention of the upper oil-impregnated bearing 15 is increased and the reliability is improved.

Furthermore, the upper end face of the upper oil-impregnated bearing 15 protrudes from the top face of the first inward flange 11B.

Furthermore, the attraction magnet 81 is positioned by way of the outer circumferential face of the upper oil-impregnated bearing 15 protruding from the top face of the first inward flange 11B, and is fixed to the top face of the first inward flange 11B.

Accordingly, when fixing the attraction magnet 81 to the first inward flange 11B, it is possible to easily position the attraction magnet 81 on the motor case 11 without using a dedicated tool.

Second Exemplary Mode of Embodiment

A vibration motor 1B according to a second exemplary mode of embodiment of the present invention will be described using FIG. 2. In FIG. 2, parts that are the same as parts in FIG. 1 are given identical reference numerals, and description of redundant parts is omitted.

The upper oil-impregnated bearing 15 according to the first exemplary mode of embodiment has a cylindrical part 15A and an outward flange 15B formed integrally with the lower portion of the outer circumferential face of the cylindrical part 15A but the upper oil-impregnated bearing 16 in this example takes the form of a simple cylindrical part without an outward flange.

Furthermore, in the first exemplary mode of embodiment, the inside of the first inward flange 11B constitutes the bearing holder for the upper oil-impregnated bearing 15.

However, the motor case 12 of this example is such that, in the motor case 11 according to the first exemplary mode of embodiment, a cylindrical second tubular part 12A is formed integrally protruding upward from the inner circumferential face of the first inward flange 11B and a second inward flange 12B is integrally formed in the inward direction from the upper opening end of the second tubular part 12A. That is to say, in this example, the second tubular part 12A and the second inward flange 12B are configured as a part of the first inward flange 11B. Thus, the second tubular part 12A serves as a bearing holder for the upper oil-impregnated bearing 16.

In the present example, the upper end face of the upper oil-impregnated bearing 16 abuts the bottom face of the second inward flange 12B, such that the second inward flange 12B serves as a retainer 19.

Furthermore, the outer circumferential face of the upper oil-impregnated bearing 16 and the inner circumferential face of the second tubular part 12A are of the same size, and when the upper oil-impregnated bearing 16 is press-fitted into the second tubular part 12A, the oil-impregnated bearing 16 is fixed in the second tubular part 12A. Thus, the upper end face of the upper oil-impregnated bearing 16 contacts the bottom face of the second inward flange 12B, and the upper end face of the upper oil-impregnated bearing 16 does not protrude upward beyond the second inward flange 12B.

Furthermore, the inner circumferential face of the second inward flange 12B is circular and the inner diameter of the second inward flange 12B is made larger than the inner diameter of the upper oil-impregnated bearing 16.

Furthermore, the attraction magnet 81 in the first exemplary mode of embodiment is fixed to the top face of the first inward flange 11B, but the attraction magnet 82 in this example is fixed to the lower end face of the weight 70. The reason for this is that, in a mode in which the bearing holder (second tubular part 12A) protrudes upward from the first inward flange 11B, if the attraction magnet is disposed on the top face of the first inward flange 11B, in the case where the axial height of the attraction magnet is less than the axial height of the bearing holder, with a semi-cylindrical weight 70, the weight 70 would be distanced from this attraction magnet and thus sufficient magnetic attraction could not readily be produced. Meanwhile, if the axial height of the attraction magnet is greater than the axial height of the bearing holder, the magnetic attraction would be enhanced but the cost of the attraction magnet would be increased.

Here, in a mode in which the bearing holder (the second tubular part 12A) protrudes upward from the first inward flange 11B, by fixing the attraction magnet 82 to the lower end face of the weight 70, the attraction magnet 82 can be disposed close to the second inward flange 12B on the motor case, such that the outer diameter of the attraction magnet 82 can be reduced. Further, magnetic attraction toward the motor case is readily produced, even if the axial height of the attraction magnet 82 is low, and thus the cost of the attraction magnet can be reduced.

The outer diameter of the attraction magnet 82 in this example is larger than the outer diameter of the second tubular part 12A. This attraction magnet 82 is fixed in a recess 73 provided in the lower end face of the weight 70, and faces the second inward flange 12B with a predetermined distance maintained therebetween. The axial height of this recess 73 is less than the axial height of the attraction magnet 82. When the attraction magnet 82 is mounted in the recess 73, the attraction magnet 82 protrudes from the bottom face of the weight 70 and is fixed in the recess 73 without using an adhesive material.

Thus, in the mode in this example, in contrast with the conventional mode, the weight 70 is magnetically attracted toward the motor case side, and therefore the sound of the impact between the washer 50, which moves united with the rotor unit 40, and the upper oil-impregnated bearing 16 can be reduced when the rotary shaft 30 moves in the vertical direction in conjunction with the eccentric oscillation of the weight 70.

Furthermore, since the washer 50 is soft, the impact sounds generated by the axial movement of the rotary shaft 30 can be further reduced.

Furthermore, since the retainer 19, which is abutted by the upper end face of the upper oil-impregnated bearing 16, is formed on the motor case 11, the strength of retention of the upper oil-impregnated bearing 16 when the washer 50, which moves united with the rotor unit 40, impacts the upper oil-impregnated bearing 16, can be enhanced, allowing for a highly reliable vibration motor.

Furthermore, the attraction magnet 82 is a cylinder fixed to the bottom face of the weight 70, and the bottom face of the attraction magnet 82 faces the second inward flange 12B.

Accordingly, the sound of the impact between the rotor unit 40 and the upper oil-impregnated bearing 16 when the rotary shaft 30 moves in the vertical direction in conjunction with the eccentric oscillation of the weight 70 can be effectively reduced.

Two exemplary modes of embodiment of the present invention were described above, but the present invention is not limited to these exemplary modes of embodiment, and it is a matter of course that the exemplary modes of embodiment described above can be suitably modified or the like, within a range that does not depart from the gist of the present invention.

What is claimed is:

1. A vibration motor for generating vibration, comprising:
a motor case made of a magnetic material, which has a first tubular part having an upper opening end and a lower opening end, and a first inward flange integrally formed in a flange shape in the inward direction from the upper opening end;
a bracket, which is fixed to the lower opening end;
an upper oil-impregnated bearing, which is fixed inside the first inward flange;
a lower oil-impregnated bearing, which is fixed to the bracket;
a rotary shaft, which is supported in the upper oil-impregnated bearing and the lower oil-impregnated bearing, an upper portion of which protrudes from the motor case;
a rotor unit, which is fixed to the rotary shaft within the motor case,
a washer, into which the rotary shaft is inserted, provided between the rotor unit and the upper oil-impregnated bearing;
a weight made of a magnetic material, which is eccentrically fixed to an upper portion of the rotary shaft; and
an attraction magnet fixed to the motor case or the weight, which attracts the weight toward the motor case,
wherein,
a retainer is formed on the motor case, which abuts against the upper oil-impregnated bearing in the axial direction when the upper oil-impregnated bearing is subjected to force in the upward direction and prevents the upper oil-impregnated bearing from coming out in the upward direction; and
the upper end face of the upper oil-impregnated bearing protrudes from the top face of the first inward flange; and
the attraction magnet is positioned by way of the outer circumferential face of the upper oil-impregnated bearing that protrudes from the top face of the first inward flange and is fixed to the top face of the first inward flange.

2. The vibration motor according to claim 1, wherein:
the upper oil-impregnated bearing has a cylindrical part and an outward flange integrally formed with a lower portion of the outer circumferential face of the cylindrical part;
the retainer is the bottom face of the first inward flange; and
an upper end face of the outward flange abuts the retainer.

* * * * *